United States Patent
Takata et al.

(10) Patent No.: US 9,780,499 B2
(45) Date of Patent: Oct. 3, 2017

(54) POWER RECEIVING CONNECTOR AND COMMUNICATION SYSTEM

(71) Applicants: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP); TOYOTA JIDOSHA KABUSHIKI KAISHA, Aichi (JP)

(72) Inventors: Yousuke Takata, Osaka (JP); Ryou Okada, Osaka (JP); Takeshi Hagihara, Osaka (JP); Yutaka Komatsu, Osaka (JP); Nobuyuki Nakagawa, Aichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 535 days.

(21) Appl. No.: 14/371,409

(22) PCT Filed: Dec. 29, 2012

(86) PCT No.: PCT/JP2012/084245
§ 371 (c)(1),
(2) Date: Jul. 9, 2014

(87) PCT Pub. No.: WO2013/105477
PCT Pub. Date: Jul. 18, 2013

(65) Prior Publication Data
US 2015/0011123 A1 Jan. 8, 2015

(30) Foreign Application Priority Data
Jan. 10, 2012 (JP) .................................. 2012-002507

(51) Int. Cl.
*H01R 13/66* (2006.01)
*H02J 7/02* (2016.01)
(Continued)

(52) U.S. Cl.
CPC ........ *H01R 13/665* (2013.01); *B60L 11/1818* (2013.01); *B60L 11/1824* (2013.01);
(Continued)

(58) Field of Classification Search
CPC ... Y02T 90/166; Y02T 90/165; Y02T 90/164; Y02T 90/125; H02J 7/0027; H02J 7/025;
(Continued)

(56) References Cited

U.S. PATENT DOCUMENTS

| 5,596,258 A | 1/1997 | Kimura et al. |
| 2006/0170285 A1 | 8/2006 | Morimitsu et al. |

(Continued)

FOREIGN PATENT DOCUMENTS

| CN | 101394105 A | 3/2009 |
| CN | 102106056 A | 6/2011 |

(Continued)

OTHER PUBLICATIONS

Notice of Allowance issued in related U.S. Appl. No. 14/371,410, dated Aug. 31, 2016.
(Continued)

*Primary Examiner* — Drew A Dunn
*Assistant Examiner* — Sailesh Thapa
(74) *Attorney, Agent, or Firm* — McDermott Will & Emery LLP

(57) ABSTRACT

The power receiving connector to be placed as a vehicle-mounted feeding port is formed by integrating connection terminals, internal wirings, wiring branch parts, a ground wire side branch line, a control wire side branch line,
(Continued)

capacitors, a superposition separation element, and a low-pass filter with a housing as a replaceable unit.

31 Claims, 11 Drawing Sheets

(51) Int. Cl.
*B60L 11/18* (2006.01)
*H02J 7/00* (2006.01)

(52) U.S. Cl.
CPC ....... *B60L 11/1838* (2013.01); *B60L 11/1846* (2013.01); *B60L 11/1861* (2013.01); *H02J 7/02* (2013.01); *B60L 2210/30* (2013.01); *B60L 2230/12* (2013.01); *B60L 2270/147* (2013.01); *H01R 2201/26* (2013.01); *H02J 2007/0096* (2013.01); *Y02T 10/705* (2013.01); *Y02T 10/7005* (2013.01); *Y02T 10/7044* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ........ H02J 7/0042; H02J 50/12; H02J 7/0054; H02J 7/0026; H02J 7/0045; H02J 7/007; H02J 2007/0062; H02J 50/10; H02J 50/90; H02J 7/0021; H02J 7/0047; H02J 2007/0059; B60L 2230/34; B60L 2230/00; B60L 11/1838
USPC ....................................................... 320/109
See application file for complete search history.

(56) References Cited

U.S. PATENT DOCUMENTS

| | | |
|---|---|---|
| 2008/0154387 A1 | 6/2008 | Nambu |
| 2009/0072794 A1 | 3/2009 | Okuno |
| 2010/0007306 A1 | 1/2010 | Fukui et al. |
| 2011/0121779 A1 | 5/2011 | Ichikawa et al. |
| 2012/0029728 A1* | 2/2012 | Hirayama ........... B60L 11/1838 701/1 |
| 2012/0098488 A1 | 4/2012 | Ichikawa |
| 2015/0011123 A1 | 1/2015 | Takata et al. |
| 2015/0015203 A1 | 1/2015 | Takata et al. |

FOREIGN PATENT DOCUMENTS

| | | |
|---|---|---|
| DE | 102009025302 A1 | 12/2010 |
| EP | 2309617 A1 | 4/2011 |
| FR | 2 936 630 A1 | 4/2010 |
| JP | 61-136327 A | 6/1986 |
| JP | 2001-008455 A | 1/2001 |
| JP | 2010-022163 A | 1/2010 |
| JP | 2010-239845 A | 10/2010 |
| JP | 2011-010420 A | 1/2011 |
| JP | 4883252 B2 | 2/2012 |
| JP | 2013-090422 A | 5/2013 |
| TW | 201108560 A | 3/2011 |
| WO | 2008/046869 A1 | 4/2008 |
| WO | 2010145898 A1 | 12/2010 |
| WO | 2011/077505 A1 | 6/2011 |
| WO | 2011/107851 A1 | 9/2011 |
| WO | 2013035852 A1 | 3/2013 |

OTHER PUBLICATIONS

Extended European Search Report issued in corresponding European Patent Application No. 12865536.2, mailed on Sep. 25, 2015.
International Search Report dated Feb. 26, 2013 issued in PCT/JP2012/084243.
Notification of the First Office Action in Chinese Patent Application No. 201280066677.4 dated Mar. 4, 2016 with full English translation.
Supplementary European Search Report issued in EP Patent Application No. 12865433.2 dated Feb. 4, 2016.
U.S. Office Action dated May 18, 2016 issued in U.S. Appl. No. 14/371,410.
Decision to Grant issued in corresponding Japanese Patent Application No. 2013-553263, mailed on Mar. 29, 2016, with English translation.
Surface Vehicle Recommended Practice, J1772 Jan. 2010, Society of Automotive Engineers, Inc., Oct. 1996 (revised in Jan. 2010), pp. 1-51.
International Search Report issued in Application No. PCT/JP2012/084245 dated Feb. 19, 2013.

* cited by examiner

F I G. 4
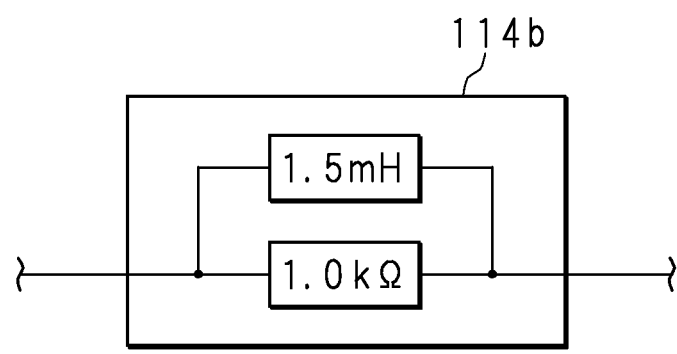

POWER RECEIVING CONNECTOR AND COMMUNICATION SYSTEM

CROSS-REFERENCE TO RELATED APPLICATIONS

This application is the national phase under 35 U.S.C. §371 of PCT International Application No. PCT/JP2012/84245 which has an International filing date of Dec. 29, 2012 and designated the United States of America and claims the priority of JP 2012-002507 filed Jan. 10, 2012, the entire disclosures of which are incorporated herein.

FIELD

The present application relates to a power receiving connector, which is to be connected with a charging cable extending from a feed device for power feeding from the feed device to an electric power storage device mounted on a vehicle, and to a communication system, which uses the power receiving connector.

BACKGROUND

In recent years, an electric automobile and a hybrid automobile, which have devices such as a motor and a battery mounted thereon and run by driving the motor with electric power stored in the battery, have begun to spread. Regarding an electric automobile, charging to a battery is achieved by power feeding from an outside feed device. Even regarding a hybrid automobile, a plug-in hybrid automobile, in which charging from an outside feed device to a battery can be performed, has come into practical use. It is to be noted that the outside feed device is a feed device, which is located in facilities such as an ordinary house or a commercial power feeding station. For power feeding from a feed device to a vehicle, a plug at a tip of a charging cable connected with the feed device is connected with a feeding port, which is placed in a vehicle as a power receiving connector. In addition, power feeding from the feed device via a feeder wire, which is included in the charging cable, to the vehicle is performed and the battery is charged.

It is to be noted that the charging cable includes not only the feeder wire but also other wiring such as a ground wire and a control wire. A control wire is a wiring, which is to be used for transmission of a control signal such as a control pilot signal to be used for power feeding control of an electric power storage device. By transmitting and receiving a control signal between a feed device and a vehicle via the control wire, various states such as a connection state of a charging cable, a state of the possibility of charging, and a state of charging are detected, and charge control corresponding to detected states is performed.

Furthermore, for practical application of an automobile such as an electric automobile or a hybrid automobile which requires power feeding from outside, demanded is a communication function to transmit and receive information, which is to be used for charge control, and communication information, which is to be used for management of charge amount or accounting or the like, between a vehicle and a feed device.

Therefore, standardization of communication such as inband communication for superimposing a communication signal on a control signal and transmitting and receiving an obtained signal between a vehicle and a feed device is being promoted (see "SURFACE VEHICLE RECOMMENDED PRACTICE", J1772 January 2010, Society of Automotive Engineers, Inc., October 1996 (revised in January 2010), for example).

FIG. 11 is an explanatory drawing for illustrating a structure example of a system, standardization of which is being promoted. Denoted at 1000 in FIG. 11 is a vehicle, and the vehicle 1000 is connected with a charging cable 3000 for power feeding from a feed device 2000. The charging cable 3000 includes two feeder wires 3001 and 3002 to be used as electric power supply wires, a ground wire 3003 which is a lead for grounding, and a control wire 3004 configured to transmit a control signal such as a control pilot signal (CPLT) to be used for charge control.

One end of the charging cable 3000 is connected with a feed device 2000 side, and power feeding becomes possible by connecting a plug 3005, which is provided at the other end side, with a power receiving connector 1001, which is placed at a feeding port at a vehicle 1000 side as a connection part.

The feed device 2000 is provided with an electric power supply unit 2001 configured to supply AC electric power, a charge control unit 2002 configured to perform communication pertaining to charge control, a communication unit 2003 configured to transmit and receive a communication signal, and a superposition separation unit 2004 configured to superpose and separate the communication signal for the ground wire 3003 and the control wire 3004.

In addition, the superposition separation unit 2004 superposes various kinds of communication signals for the ground wire 3003 and the control wire 3004, and separates various kinds of superposed communication signals. Communication by the communication unit 2003 is achieved when the superposition separation unit 2004 superposes various kinds of communication signals outputted from the communication unit 2003 and inputs various kinds of separated communication signals to the communication unit 2003.

The vehicle 1000 is provided with the power receiving connector 1001, a battery 1002, a charging device 1003 configured to charge the battery 1002, a charge control device 1004 configured to perform communication pertaining to charge control, a communication device 1005 configured to transmit and receive a communication signal, and a superposition separation element 1006 configured to superpose and separate a communication signal for the ground wire 3003 and the control wire 3004.

In addition, the superposition separation element 1006 superposes various kinds of communication signals for the ground wire 3003 and the control wire 3004, and separates various kinds of superposed communication signals.

Communication by the communication device 1005 is achieved when the superposition separation element 1006 superposes various kinds of communication signals outputted from the communication device 1005 and inputs various kinds of separated communication signals to the communication device 1005.

SUMMARY

A system having the structure illustrated in FIG. 11, however, has a problem that various noise made by various kinds of equipment in a vehicle affects a communication signal to be transmitted through wiring in the vehicle.

Moreover, an example of a method of transmitting a communication signal other than inband communication described above is power line communication. Such a communication method, however, is still at the investigation stage for formulation and employment of a standard, and therefore different communication methods may possibly be employed in countries or regions. This causes a problem that large man-hour of operations is required for replacement of members such as a power receiving connector so as to adapt a vehicle corresponding to power line communication to inband communication, or for the opposite case.

The present invention has been made in view of such a situation, and the main object thereof is to provide a power receiving connector and a communication system wherein various kinds of elements, circuits and wirings required for communication such as inband communication are provided in a power receiving connecter, so that the influence of noise on a communication signal can be reduced.

Moreover, another object of the present invention is to provide a power receiving connector and a communication system configured so that the man-hour of replacement operations for conversion to communication of a different form such as power line communication or inband communication can be decreased.

A power receiving connector according to the present invention is a power receiving connector, which can be placed in a vehicle and can be connected with a feeder wire to be used for power feeding, with a ground wire, and with a control wire configured to transmit a control signal to be used for power feeding control, characterized by comprising: a plurality of connection terminals to be connected with the feeder wire, the ground wire and the control wire; a plurality of internal wirings to be connected with the feeder wire, the ground wire and the control wire via the connection terminals; a wiring branch part provided at each of internal wiring to be connected with the ground wire and internal wiring to be connected with the control wire; a superposition separation element, which is connected with a ground wire side branch line that branches from the wiring branch part at a ground wire side and with a control wire side branch line that branches from the wiring branch part at a control wire side, configured to superpose and separate a communication signal, which is different from the control signal, for the ground wire and the control wire; and a capacitor, which is interposed in one or both of the ground wire side branch line and the control wire side branch line, configured to pass a signal of a band to be used for the communication signal.

A power receiving connector according to the present invention is a power receiving connector, which can be placed in a vehicle and can be connected with a feeder wire to be used for power feeding, with a ground wire, and with a control wire configured to transmit a control signal to be used for power feeding control, characterized by comprising: a plurality of connection terminals to be connected with the feeder wire, the ground wire and the control wire; a plurality of internal wirings to be connected with the feeder wire, the ground wire and the control wire via the connection terminals; a wiring branch part provided at each of internal wiring to be connected with the ground wire and internal wiring to be connected with the control wire; a superposition separation element, which is connected with a ground wire side branch line that branches from the wiring branch part at a ground wire side and with a control wire side branch line that branches from the wiring branch part at a control wire side, configured to superpose and separate a communication signal, which is different from the control signal, for the ground wire and the control wire; a capacitor, which is interposed in one or both of the ground wire side branch line and the control wire side branch line, configured to pass a signal of a band to be used for the communication signal; and a low-pass filter, which is interposed in at least one of internal wiring at a ground wire side and internal wiring at a control wire side, configured to pass a signal of a band to be used for the control signal.

A power receiving connector according to the present invention is a power receiving connector, which can be placed in a vehicle and can be connected with a feeder wire to be used for power feeding, with a ground wire, and with a control wire configured to transmit a control signal to be used for power feeding control, characterized by comprising: a plurality of connection terminals to be connected with the feeder wire, the ground wire and the control wire; a plurality of internal wirings to be connected with the feeder wire, the ground wire and the control wire via the connection terminals; a wiring branch part provided at each of internal wiring to be connected with the ground wire and internal wiring to be connected with the control wire; and a capacitor, which is interposed in one or both of a ground wire side branch line that branches from the wiring branch part at a ground wire side and a control wire side branch line that branches from the wiring branch part at a control wire side, configured to pass a signal of a band to be used for a communication signal, which is different from the control signal.

A power receiving connector according to the present invention is characterized in that the ground wire side branch line and the control wire side branch line can be connected with a superposition separation element configured to superpose and separate the communication signal, which is different from the control signal, for the ground wire and the control wire.

A power receiving connector according to the present invention is a power receiving connector, which can be placed in a vehicle and can be connected with a feeder wire to be used for power feeding, with a ground wire, and with a control wire configured to transmit a control signal to be used for power feeding control, characterized by comprising: a plurality of connection terminals to be connected with the feeder wire, the ground wire and the control wire; a plurality of internal wirings to be connected with the feeder wire, the ground wire and the control wire via the connection terminals; a wiring branch part provided at each of internal wiring to be connected with the ground wire and internal wiring to be connected with the control wire; and a low-pass filter, which is interposed in at least one of internal wiring at a ground wire side and internal wiring at a control wire side, configured to pass a signal of a band to be used for the control signal.

A power receiving connector according to the present invention is characterized in that the ground wire side branch line and the control wire side branch line can be connected with a superposition separation element configured to superpose and separate a communication signal, which is different from the control signal, for the ground wire and the control wire, via a capacitor configured to pass a signal of a band to be used for a communication signal, which is different from the control signal.

A power receiving connector according to the present invention is characterized in that the superposition separation element has: a primary coil to be connected with the ground wire side branch line and the control wire side branch line; and a secondary coil to be coupled electromagnetically with the primary coil, and the secondary coil can be connected with a communication device configured to transmit and receive the communication signal via the control wire and the ground wire.

A power receiving connector according to the present invention is characterized in that the primary coil of the superposition separation element can be connected with the capacitor by a twisted wire pair.

A power receiving connector according to the present invention is characterized in that the secondary coil of the superposition separation element can be connected with the communication device by a twisted wire pair.

A power receiving connector according to the present invention is characterized in that a choke coil is provided in the communication device, and the secondary coil of the superposition separation element can be connected with the choke coil by a twisted wire pair.

A power receiving connector according to the present invention is characterized by further comprising a low-pass filter, which is interposed in at least one of internal wiring at a ground wire side and internal wiring at a control wire side, configured to pass a signal of a band to be used for the control signal.

A communication system according to the present invention is a communication system for connecting a feed device with a vehicle, which is provided with an electric power storage device to be fed from the feed device, by a charging cable, which includes a feeder wire to be used for power feeding, a ground wire and a control wire configured to transmit a control signal to be used for power feeding control of the electric power storage device, and for transmitting and receiving a communication signal, which is different from the control signal, using the control wire as a medium, characterized in that the vehicle comprises: the power receiving connecter to be connected with a charging cable extending from the feed device; and a communication device configured to transmit and receive a communication signal to and from the feed device via the power receiving connector, and the communication device is connected with a secondary coil of the superposition separation element.

A communication system according to the present invention is characterized in that the power receiving connector and the communication device are connected with each other by a twisted wire pair, and the communication device further comprises a choke coil to be connected with the twisted wire pair.

With the present invention, it is possible to shorten internal wiring in a section where a communication signal is superposed.

Moreover, with the present invention, it is possible to incorporate members pertaining to inband communication in a housing and to handle the members integrally.

Moreover, with the present invention, it is possible to prevent leakage of a communication signal from a power receiving connector, by providing a low-pass filter. Furthermore, by providing a low-pass filter, it is possible to prevent deterioration in communication quality due to the influence of a capacitor in an input circuit of the charge control device.

Moreover, with the present invention, the influence of noise on a communication signal is reduced by using a twisted wire pair. Furthermore, by connecting the choke coil which functions as a common mode choke coil with the twisted wire pair, it is possible to decrease common mode noise.

In a power receiving connector and a communication system according to the present invention, internal wiring in a section where a communication signal is superposed is shortened by providing a capacitor, a superposition separation element, a low-pass filter, and various kinds of other elements, circuits and wirings, which are required for communication such as inband communication, in a power receiving connector. This exhibits excellent effects such that a communication signal is hardly influenced by an electromagnetic wave made by equipment in a vehicle and that it is possible to prevent an electromagnetic wave generated by transmission of a communication signal from influencing other equipment in a vehicle.

Moreover, since members pertaining to inband communication can be handled integrally, exhibited are excellent effects such that operations for replacement of members are facilitated in a case where a vehicle corresponding to power line communication is to be changed into a vehicle corresponding to inband communication, for example.

Also, the present invention exhibits excellent effects such that the influence of an electromagnetic wave can be further decreased by preventing leakage of a communication signal from a power receiving connector with a low-pass filter. Moreover, exhibited are excellent effects such that deterioration in communication quality due to the influence of a capacitor in an input circuit of a charge control device can be prevented by providing a low-pass filter, and communication quality is also improved.

Furthermore, the present invention exhibits excellent effects such that the influence of noise on a communication signal can be reduced by using a twisted wire pair and a choke coil.

The above and further objects and features will more fully be apparent from the following detailed description with accompanying drawings.

BRIEF DESCRIPTION OF THE DRAWINGS

FIG. 4 is a circuit diagram for illustrating a structure example of a low-pass filter to be used in a charging system according to Embodiment 2.

DETAILED DESCRIPTION

The following description will explain the present invention in detail with reference to the drawings for illustrating embodiments thereof.

Embodiment 1

Figure 1:
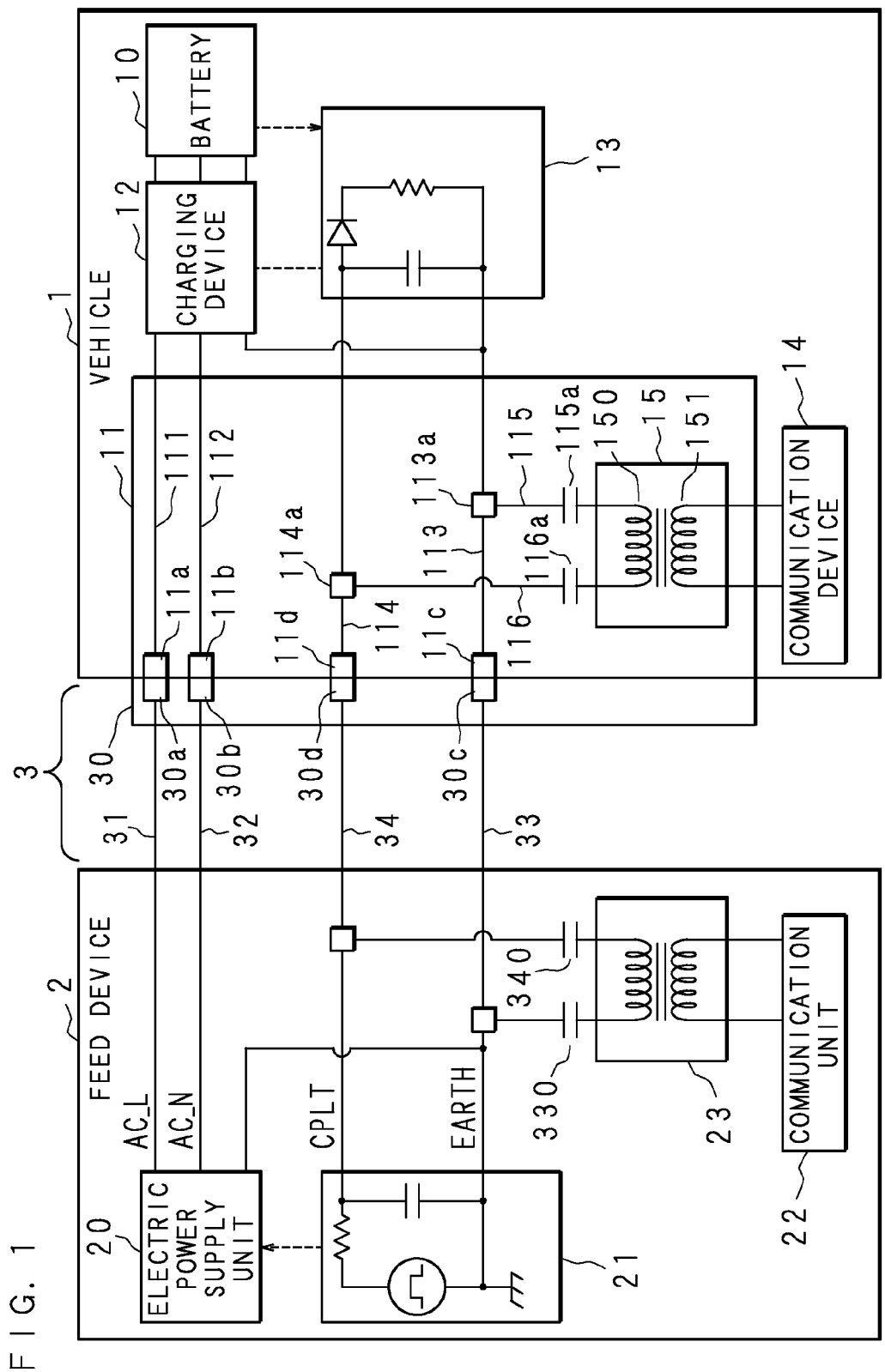
FIG. 1 is an explanatory drawing for illustrating a structure example of a charging system according to Embodiment 1.

FIG. 1 is an explanatory drawing for illustrating a structure example of a charging system according to Embodiment 1 of the present invention. FIG. 1 illustrates an example wherein a charging system according to Embodiment 1 is applied to a configuration wherein power is fed from a feed device 2 such as a charging stand to a battery (an electric power storage device) 10 provided in a vehicle 1 such as an electric automobile or a plug-in hybrid automobile. A charging system according to Embodiment 1 is a system, which is to be mounted on the vehicle 1, pertaining to charging, and a communication system configured to transmit and receive a communication signal between the vehicle 1 and the feed device 2 is constructed by connecting the vehicle 1 according to the charging system with the feed device 2.

The vehicle 1 and the feed device 2 can be connected with each other by a charging cable 3. The charging cable 3 includes two feeder wires 31 and 32 to be used as electric power supply wires, a ground wire 33 which is a lead for grounding, and a control wire 34 configured to transmit a control signal such as a control pilot signal (CPLT) to be used for charge control. One end of the charging cable 3 is connected with a feed device 2 side, and a plug 30 provided at the other end side can be connected with a power receiving connector 11, which is placed as a vehicle-mounted feeding port that functions as a connection position at a vehicle 1 side. By connecting the plug 30 at the other end of the charging cable 3 with the power receiving connector 11, connection terminals 30a, 30b, 30c and 30d, which are provided at end parts of the feeder wires 31 and 32, of the ground wire 33, and of the control wire 34 in the charging cable 3, come into contact with connection terminals 11a, 11b, 11c and 11d provided in the power receiving connector 11, so that a circuit configuration illustrated in FIG. 1 is obtained.

The feeder wires 31 and 32 are AC wires to which AC voltage is to be applied. The control wire 34 is a signal wire configured to transmit and receive a control signal such as a control pilot signal, and charge control is performed on the basis of a control pilot signal to be transmitted and received when the feed device 2 and a charge control device 13 are connected with each other. Moreover, the ground wire 33 and the control wire 34 can be used as media configured to transmit information to be used for management such as vehicle authentication, charging management or accounting management, or various kinds of other information. That is, the vehicle 1 and the feed device 2 can perform communication by superposing and separating a communication signal for the ground wire 33 and the control wire 34.

The feed device 2 is provided with an electric power supply unit 20 configured to supply AC electric power, a charge control unit 21 configured to perform communication pertaining to charge control, a communication unit 22 configured to transmit and receive a communication signal, and a superposition separation unit 23 configured to superpose and separate a communication signal for the ground wire 33 and the control wire 34.

The electric power supply unit 20 is connected with one end of each of the feeder wires 31 and 32 and with the ground wire 33. The charge control unit 21 is connected with one end of the control wire 34 and with the ground wire 33. Although wiring in the feed device 2 is hence an internal lead which functions as an extension line connected with the feeder wires 31 and 32, with the ground wire 33, and with the control wire 34 included in the charging cable 3 outside the feed device 2, an extension line part placed as an internal lead is assumed in the following description to be included in the feeder wires 31 and 32, the ground wire 33 and the control wire 34 for convenience.

The charge control unit 21 is a circuit at an output side compliant with an international standard pertaining to charge control, for example, and performs charge control in various states such as confirmation of connection or initiation of energization by transmitting and receiving a control signal such as a control pilot signal.

The superposition separation unit 23 is connected with a branch line, which branches from the ground wire 33, and with a branch line, which branches from the control wire 34, respectively via capacitors 330 and 340, and is constituted of a circuit such as a coupling transformer (a signal converter of electromagnetic induction type).

The superposition separation unit 23 superposes various kinds of communication signals for the ground wire 33 and the control wire 34, and separates various kinds of superposed communication signals. Communication by the communication unit 22 is achieved when the superposition separation unit 23 superposes various kinds of communication signals outputted from the communication unit 22 and inputs various kinds of separated communication signals to the communication unit 22.

The vehicle 1 is provided with a charging device 12 configured to charge the battery 10, the charge control device 13 configured to perform communication pertaining to charge control, a communication device 14 configured to transmit and receive a communication signal, and a superposition separation element 15 configured to superpose and separate a communication signal for the ground wire 33 and the control wire 34, in addition to the battery 10 and the power receiving connector 11.

By connecting the plug 30 of the charging cable 3 with the power receiving connector 11 of the vehicle 1, the connection terminals 30a, 30b, 30c and 30d, which are provided respectively at the other end of each of the feeder wires 31 and 32, at the other end of the ground wire 33, and at the other end of the control wire 34 included in the charging cable 3, are connected with the connection terminals 11a, 11b, 11c and 11d provided in the power receiving connector 11.

Figure 2:
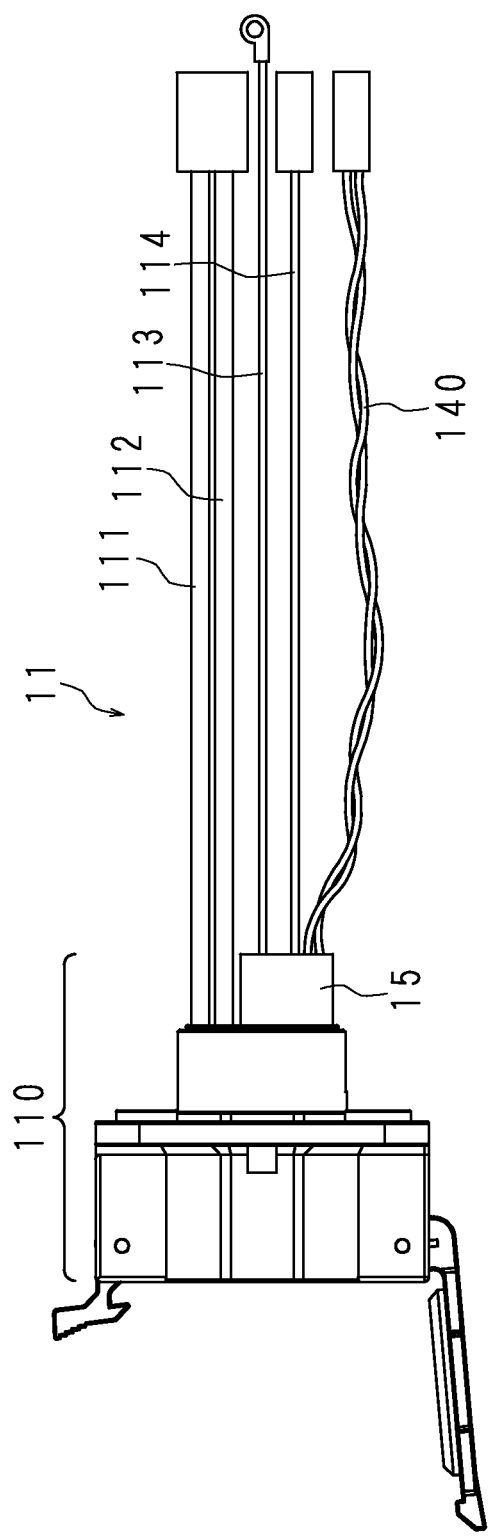
FIG. 2 is an outside drawing for illustrating an example of a power receiving connector according to Embodiment 1 of the present invention.

The power receiving connector 11 has a housing 110, which will be described later, as illustrated in FIG. 2, and internal wirings 111, 112, 113 and 114 to be connected with the feeder wires 31 and 32, with the ground wire 33, and with the control wire 34 via the connection terminals 11a, 11b, 11c and 11d are provided in the housing 110. The other end of each of the internal wirings 111 and 112 connected with the feeder wires 31 and 32 is connected with the charging device 12 via an AC wire placed inside the vehicle 1, and charging to the battery 10 is performed by the charging device 12. The other end of the internal wiring 113 connected with the ground wire 33 is connected via internal wiring in the vehicle 1 or via body earth with the charging device 12 and the charge control device 13, and further with the battery 10. The other end of the internal wiring 114 connected with the control wire 34 is connected with the charge control device 13 via an extension line placed as internal wiring in the vehicle 1. It is to be noted that each internal wiring, each AC wire and each extension line are assumed in the following description to be included in the feeder wires 31 and 32, the ground wire 33 and the control wire 34 for convenience when there is no particular need for division.

Moreover, wiring branch parts 113a and 114a are provided respectively in the internal wiring 113 to be connected with the ground wire 33, and in the internal wiring 114 to be connected with the control wire 34. Furthermore, a ground wire side branch line 115 branches from the wiring branch part 113a at a ground wire 33 side, and a control wire side branch line 116 branches from the wiring branch part 114a at a control wire 34 side.

Capacitors 115a and 116a are interposed respectively in the ground wire side branch line 115 and the control wire side branch line 116 as separation means configured to separate a control signal and a communication signal from each other, and are connected respectively with the superposition separation element 15. The capacitors 115a and 116a pass a signal of a band to be used for a communication signal and interrupt a control signal.

Regarding a band of a frequency to be used for a communication signal, a band of several tens kHz to several hundreds kHz, e.g. a band of 30 kHz to 450 kHz, is used as a band for low speed communication. Moreover, a band of several MHz to several tens MHz, e.g. a band of 2 MHz to 30 MHz, is used as a band for high speed communication. It is to be noted that a control signal, which is outputted from an oscillator of 1 kHz, becomes a signal at a frequency lower than that of a communication signal.

The charge control device 13 is a circuit at an input side compliant with an international standard pertaining to charge control, for example, and performs charge control in various states such as confirmation of connection or initiation of communication by transmitting and receiving a control signal such as a control pilot signal when being able to communicate with the charge control unit 21 of the feed device 2.

The communication device 14 is provided with a function to transmit and receive various kinds of communication signals to and from the feed device 2, and is connected with the superposition separation element 15 by a pair of communication lines.

The superposition separation element 15 is a circuit such as a coupling transformer (a signal converter of electromagnetic induction type) which is provided with a primary coil 150 to be connected with the ground wire side branch line 115 and with the control wire side branch line 116, and a secondary coil 151 to be coupled electromagnetically with the primary coil 150.

The superposition separation element 15 superposes various kinds of communication signals for the ground wire 33 and the control wire 34 via the ground wire side branch line 115 and the control wire side branch line 116, and separates various kinds of superposed communication signals. Communication by the communication device 14 is achieved when the superposition separation element 15 superposes various kinds of communication signals outputted from the communication device 14 and inputs various kinds of separated communication signals to the communication device 14.

That is, a loop circuit configured to transmit a communication signal is formed with the superposition separation element 15, the ground wire 33, the control wire 34, the superposition separation unit 23, and other wirings, elements and circuits. This makes it possible to realize inband communication of superposing a communication signal for the ground wire 33 and the control wire 34 between the communication device 14 in the vehicle 1 and the communication unit 22 of the feed device 2.

In a charging system according to Embodiment 1, the power receiving connector 11 to be placed as a vehicle-mounted feeding port is formed by integrating the connection terminals 11a, 11b, 11c and 11d, the internal wirings 111, 112, 113 and 114, the wiring branch parts 113a and 114a, the ground wire side branch line 115, the control wire side branch line 116, and the capacitors 115a and 116a with the housing 110. Moreover, the capacitors 115a and 116a are connected with the above-mentioned superposition separation element 15.

That is, in the present invention, members required for communication such as inband communication, such as various kinds of wiring, elements and circuits described above, are to be integrated with the power receiving connector 11 as a replacement unit at the time of parts replacement, i.e., a replaceable unit.

FIG. 2 is an outside drawing for illustrating an example of the power receiving connector 11 according to Embodiment 1 of the present invention. FIG. 2 illustrates a side face of the power receiving connector 11, and the housing 110 of the power receiving connector 11 illustrated in FIG. 2 has a form wherein two cylindrical bodies, which have a common center axis and have different radii and different heights, are coupled with each other, and a rectangular parallelepiped container of the superposition separation element 15 is further coupled therewith. The housing 110 is constituted of a member made of a material, such as metal or resin, selected properly in consideration of weight, size, durability, and various kinds of other factors such as electromagnetic wave shielding performance as necessary. It is to be noted that FIG. 2 illustrates a state where a cover part provided at the housing 110 is open. The cover part is opened for the purpose of connecting the plug 30 at the time of charging, for example.

A part of each of the internal wirings 111, 112, 113 and 114 is exposed from the housing 110, and a tip of each of the internal wirings 111, 112, 113 and 114 is provided with a terminal to be inserted into the vehicle 1. Moreover, a twisted wire pair 140 to be connected with the communication device 14 extends from the superposition separation element 15, and a tip of the twisted wire pair 140 is provided with a terminal to be connected with the communication device 14. Although the following description on an embodiment explains a structure wherein the communication device 14 is connected using the twisted wire pair 140, a coaxial cable, parallel lines or the like may be used instead of the twisted wire pair 140. Moreover, shielding may be applied to the twisted wire pair or the like as measure against noise. It is to be noted that a structure which uses the twisted wire pair 140 will be described later as Embodiment 3.

As described above, all or a part of the connection terminals 11a, 11b, 11c and 11d, the internal wirings 111, 112, 113 and 114, the wiring branch parts 113a and 114a, the ground wire side branch line 115, the control wire side branch line 116, and the capacitors 115a and 116a are contained inside the housing 110. Moreover, since members thereof, such as various kinds of wirings, elements and circuits, are integrated as a replaceable unit, it is possible to perform operations such as replacement of the power receiving connector 11 easily by fixing the housing 110 to the vehicle 1 by a method such as screw clamping and connecting terminals provided at the respective wirings properly. It is to be noted that design can be modified properly by providing a container of the superposition separation element 15 apart from the cylindrical bodies, for example.

As described above, the power receiving connector 11 according to Embodiment 1 of the present invention is formed by integrating the wirings, elements and circuits from the wiring branch parts 113a and 114a to the superposition separation element 15 having a coupling transformer. By integrating various kinds of wirings, elements and circuits with the power receiving connector 11, it is possible to shorten a transmission path of a communication signal, and a communication signal is prevented from flowing into a harness (wiring) in the vehicle 1 more than necessary.

This decreases the risk of abnormality such as malfunction of various kinds of equipment in the vehicle 1 or a communication failure due to the influence of an electromagnetic wave emitted from a communication signal. This also makes a communication signal and various kinds of equipment at a communication side hardly influenced by an electromagnetic wave emitted from various kinds of equipment in the vehicle 1.

Furthermore, by integrating the wirings, elements and circuits with the power receiving connector 11 to be placed as a vehicle-mounted feeding port, it is possible to make the vehicle 1 having specifications corresponding to power line communication have specifications corresponding to inband communication only by replacing the power receiving connector 11. Accordingly, the power receiving connector 11 can absorb a difference between power line communication and inband communication, and therefore it becomes possible to adapt the vehicle 1 to specification modification of communication without modifying design of the vehicle 1 itself.

Although the capacitors 115a and 116a and the superposition separation element 15 are integrated with the power receiving connector 11 in FIG. 1, it is to be noted that the superposition separation element 15 may be mounted outside the power receiving connector 11. In such a case, the superposition separation element 15 mounted outside the power receiving connector 11 is connected with the capacitors 115a and 116a mounted inside the power receiving connector 11 by a twisted wire pair or the like.

Moreover, although the capacitors 115a and 116a are interposed respectively in the ground wire side branch line 115 and the control wire side branch line 116 in the present embodiment, a capacitor may be interposed in any one of the ground wire side branch line 115 and the control wire side branch line 116.

Embodiment 2

Embodiment 2 is a configuration wherein a low-pass filter is provided on the control wire in Embodiment 1. It is to be noted that reference signs similar to those of Embodiment 1 are attached to structures similar to those of Embodiment 1 in the following description so as to refer to Embodiment 1, and detailed description thereof will be omitted.

Figure 3:
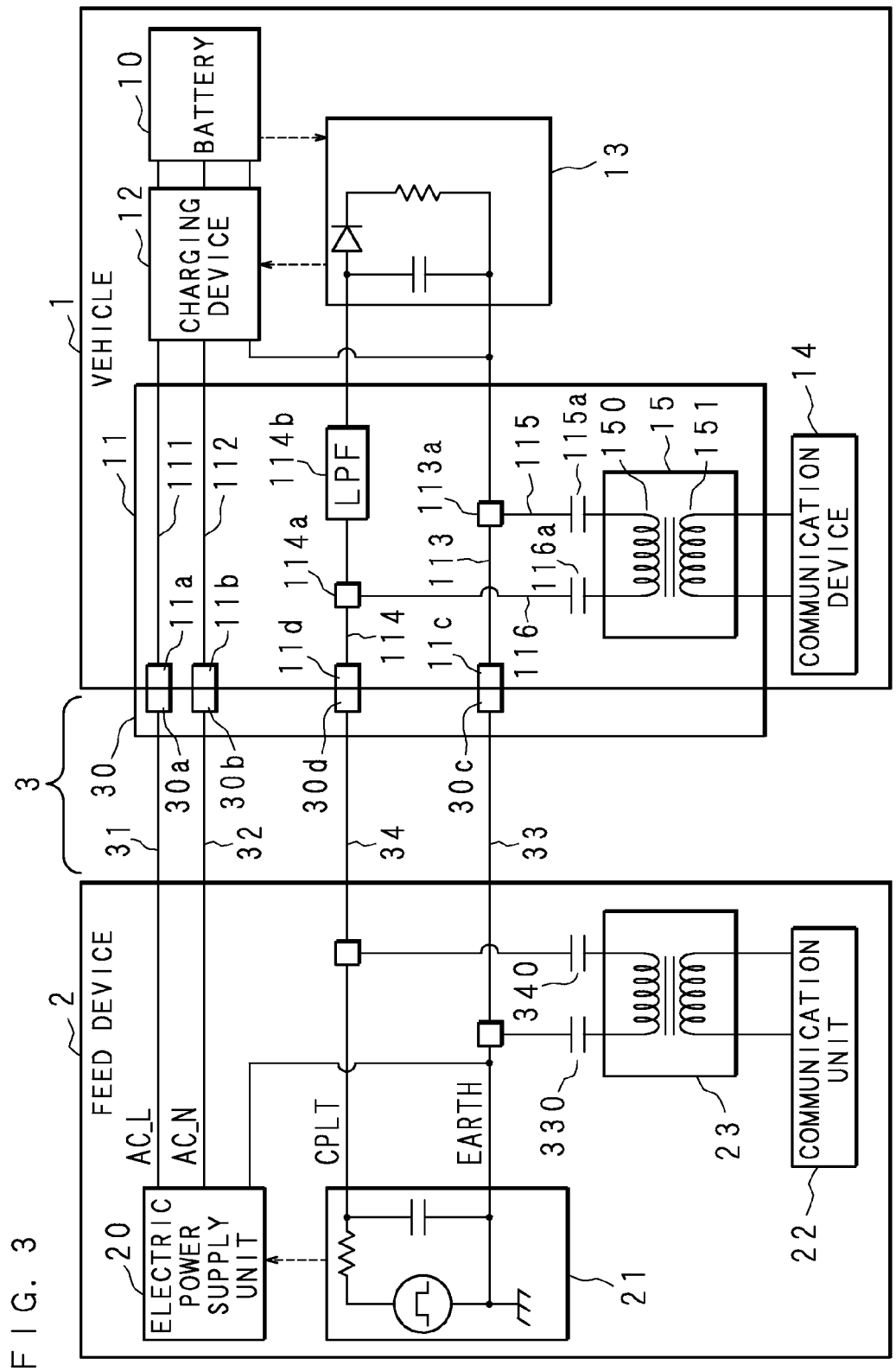
FIG. 3 is an explanatory drawing for illustrating a structure example of a charging system according to Embodiment 2.

FIG. 3 is an explanatory drawing for illustrating a structure example of a charging system according to Embodiment 2. In Embodiment 2, a low-pass filter (LPF) 114b is interposed in internal wiring 114 of a vehicle 1 to be connected with a control wire 34 as separation means configured to separate a control signal and a communication signal from each other. The low-pass filter 114b is placed on the internal wiring 114 and between a wiring branch part 114a and a charge control device 13. The low-pass filter 114b passes a signal of a band at a frequency lower than a predetermined frequency, e.g. a band to be used for a control signal, and interrupts a communication signal.

FIG. 4 is a circuit diagram for illustrating a structure example of the low-pass filter 114b to be used in a charging system according to Embodiment 2. The low-pass filter 114b is constructed as a circuit wherein a coil having an inductance of 1.5 mH and a resistance of 1.0 kΩ are arranged in parallel as illustrated in FIG. 4, for example, or an equivalent circuit thereof. It is to be noted that the low-pass filter 114b may be constituted of another circuit, as long as similar characteristics can be obtained. Moreover, the value of an element to be used for the low-pass filter is exemplary, and an element having another value may be used.

In a charging system according to Embodiment 2, a power receiving connector 11 to be placed as a vehicle-mounted feeding port is formed by integrating connection terminals 11a, 11b, 11c and 11d, internal wirings 111, 112, 113 and 114, wiring branch parts 113a and 114a, a ground wire side branch line 115, a control wire side branch line 116, capacitors 115a and 116a, a superposition separation element 15, and the low-pass filter 114b with a housing 110.

Since various kinds of wirings, elements and circuits are also integrated with the housing 110 of the power receiving connector 11 in Embodiment 2 of the present invention, an example of the exterior thereof is similar to that of the power receiving connector 11 according to Embodiment 1 illustrated using FIG. 2.

By providing the low-pass filter 114b so as to be integrated with the power receiving connector 11, leakage of a communication signal from the power receiving connector 11 is prevented, and therefore the effectiveness of the effect of decreasing mutual influence by an electromagnetic wave illustrated in Embodiment 1 can be further improved. That is, noise emitted from one of other equipment in the vehicle 1 and a transmission path of a communication signal is prevented from influencing the other, and this can prevent occurrence of abnormality such as voltage misreading of a control signal, for example. Moreover, by providing the low-pass filter, deterioration in communication quality due to the influence of a capacitor in an input circuit of the charge control device 13 can be prevented.

Figure 5:
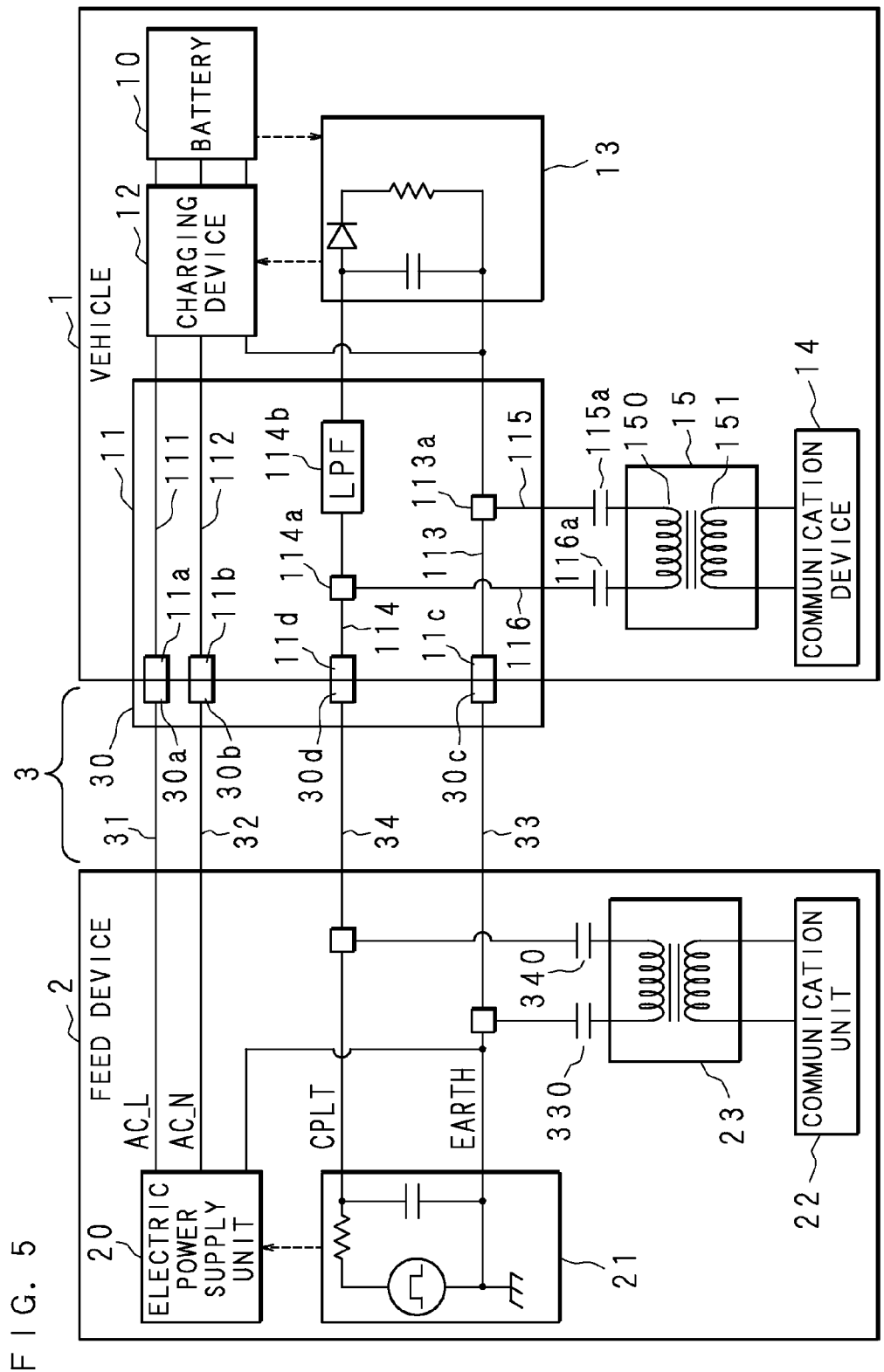
FIG. 5 is an explanatory drawing for illustrating a structure example of a charging system according to Embodiment 2.

Although Embodiment 2 is a configuration wherein the low-pass filter 114b is added to Embodiment 1, design may be modified properly regarding elements and circuits to be integrated with the housing 110. FIG. 5 is an explanatory drawing for illustrating a structure example of a charging system according to Embodiment 2. FIG. 5 illustrates another structure example of Embodiment 2 of the present invention. In the structure example illustrated in FIG. 5, the power receiving connector 11 is formed by integrating the connection terminals 11a, 11b, 11c and 11d, the internal wiring 111, 112, 113 and 114, the wiring branch parts 113a and 114a, the ground wire side branch line 115, the control wire side branch line 116, and the low-pass filter 114b with the housing 110. That is, the structure example illustrated in FIG. 3 is changed into a structure wherein the capacitors 115a and 116a and the superposition separation element 15 are not integrated and are separated.

Figure 6:
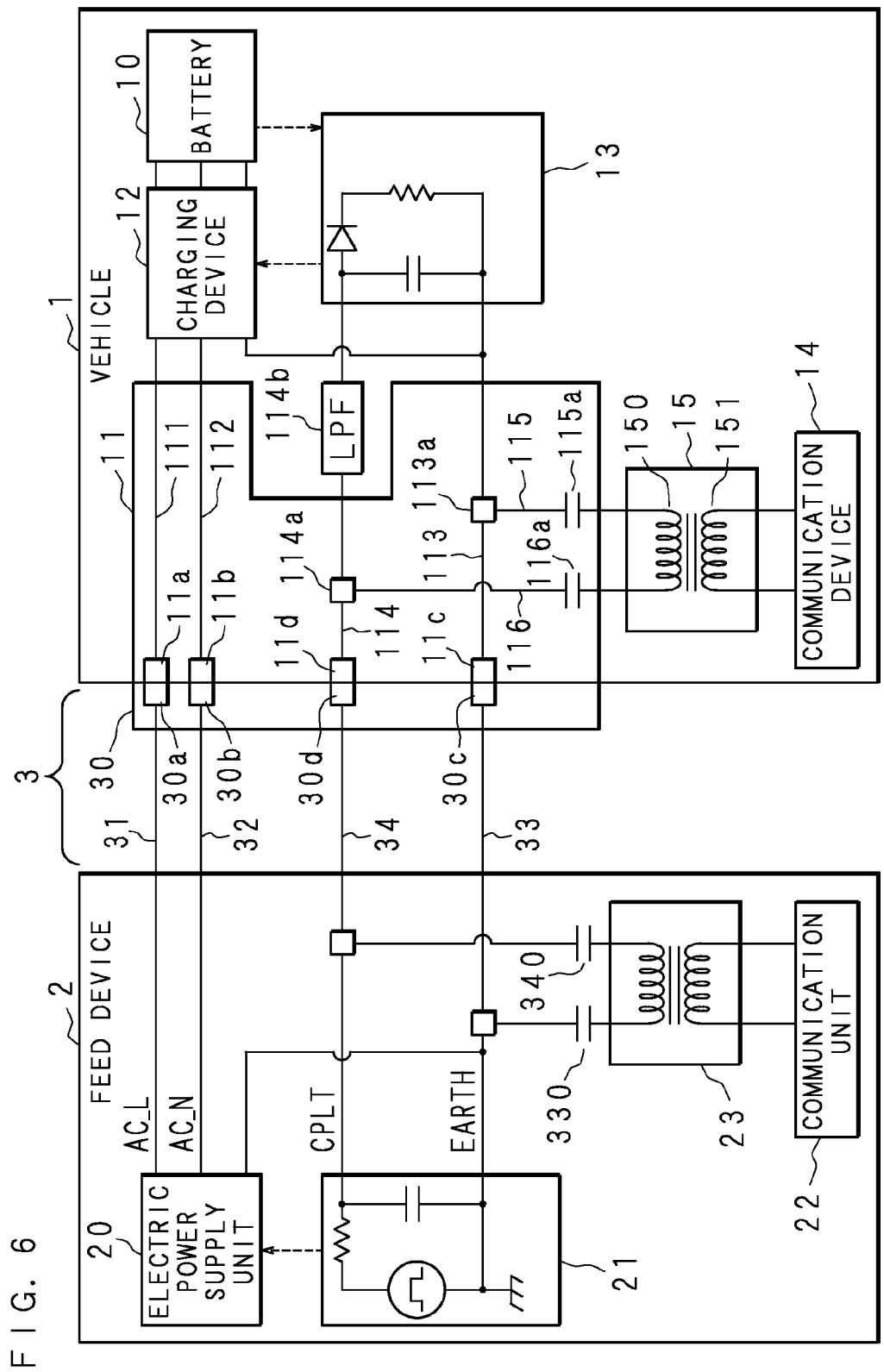
FIG. 6 is an explanatory drawing for illustrating a structure example of a charging system according to Embodiment 2.

FIG. 6 is an explanatory drawing for illustrating a structure example of a charging system according to Embodiment 2. FIG. 6 illustrates yet another structure example of Embodiment 2 of the present invention. In the structure example illustrated in FIG. 6, the power receiving connector 11 is formed by integrating the connection terminals 11a, 11b, 11c and 11d, the internal wirings 111, 112, 113 and 114, the wiring branch parts 113a and 114a, the ground wire side branch line 115, the control wire side branch line 116, and the capacitors 115a and 116a with the housing 110. That is, the structure example illustrated in FIG. 3 is changed into a structure wherein the superposition separation element 15 and the low-pass filter 114b are not integrated and are separated.

Figure 7:
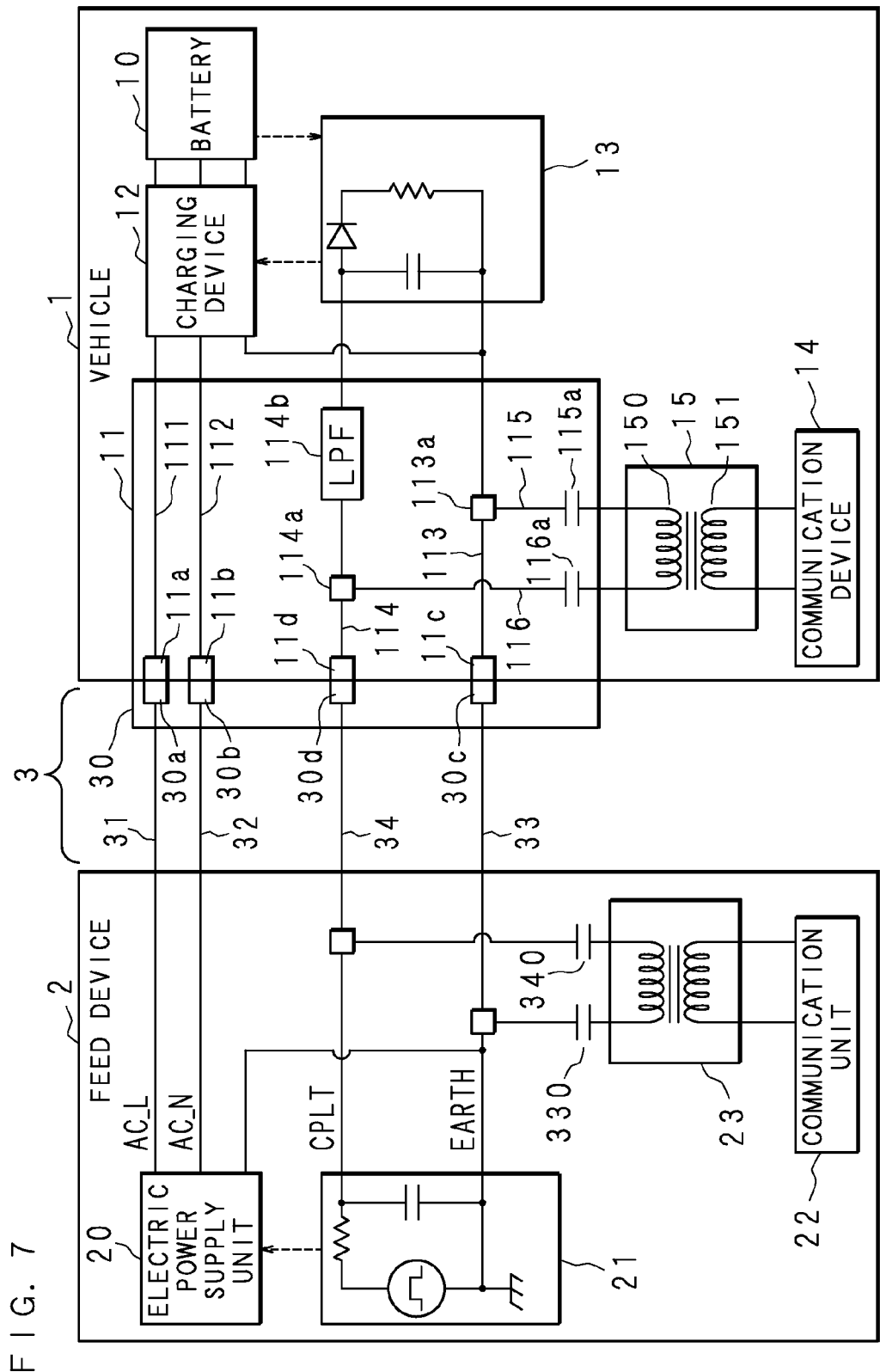
FIG. 7 is an explanatory drawing for illustrating a structure example of a charging system according to Embodiment 2.

FIG. 7 is an explanatory drawing for illustrating a structure example of a charging system according to Embodiment 2. FIG. 7 illustrates yet another structure example of Embodiment 2 of the present invention. In the structure example illustrated in FIG. 7, the power receiving connector 11 is formed by integrating the connection terminals 11a, 11b, 11c and 11d, the internal wirings 111, 112, 113 and 114, the wiring branch parts 113a and 114a, the ground wire side branch line 115, the control wire side branch line 116, the capacitors 115a and 116a, and the low-pass filter 114b with the housing 110. That is, the structure example illustrated in FIG. 3 is changed into a structure wherein the superposition separation element 15 is not integrated and is separated.

Figure 8:
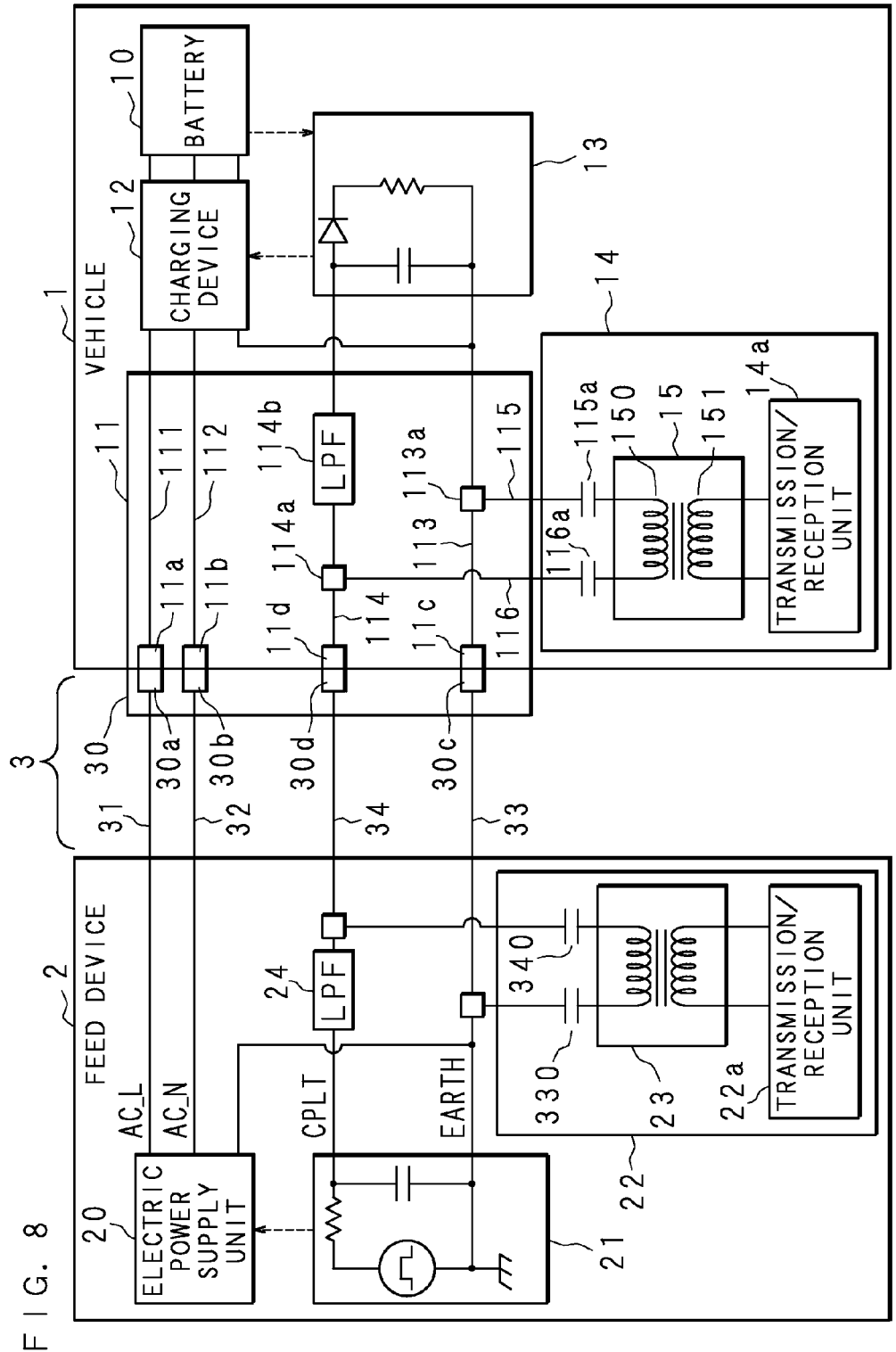
FIG. 8 is an explanatory drawing for illustrating a structure example of a charging system according to Embodiment 2.

FIG. 8 is an explanatory drawing for illustrating a structure example of a charging system according to Embodiment 2. FIG. 8 illustrates yet another structure example of Embodiment 2 of the present invention. In the structure example illustrated in FIG. 8, the power receiving connector 11 is formed by integrating the connection terminals 11a, 11b, 11c and 11d, the internal wirings 111, 112, 113 and 114, the wiring branch parts 113a and 114a, the ground wire side branch line 115, the control wire side branch line 116, and the low-pass filter 114b with the housing 110. That is, the structure example illustrated in FIG. 3 is changed into a structure wherein the capacitors 115a and 116a, and the superposition separation element 15 are not integrated and are separated as in FIG. 5.

Moreover, in the structure example illustrated in FIG. 8, the capacitors 115a and 116a and the superposition separation element 15 are provided inside a communication device 14. Both ends of a secondary coil 151 in the superposition separation element 15 are connected with a transmission/reception unit 14a having a function to transmit and receive a communication signal. The transmission/reception unit 14a is provided with a Tx protective circuit, an Rx filter, an AFE (Analog Front End) circuit or the like, for example.

Moreover, as illustrated in FIG. 8, a feed device 2 may also have a structure wherein capacitors 330 and 340 and a superposition separation unit 23 are provided inside a communication unit 22 as in the vehicle 1. In such a case, a secondary coil side of the superposition separation unit 23 is connected with a transmission/reception unit 22a having a function to transmit and receive a communication signal. Furthermore, a low-pass filter (LPF) may be provided inside the feed device 2, and FIG. 8 illustrates a structure example wherein a low-pass filter 24 is provided in the control wire 34. It is to be noted that an insertion position of the low-pass filter is not limited to the control wire 34, and the low-pass filter may be inserted in a ground wire 33 or may be built in a charge control unit 21 or the communication unit 22.

Figure 9:
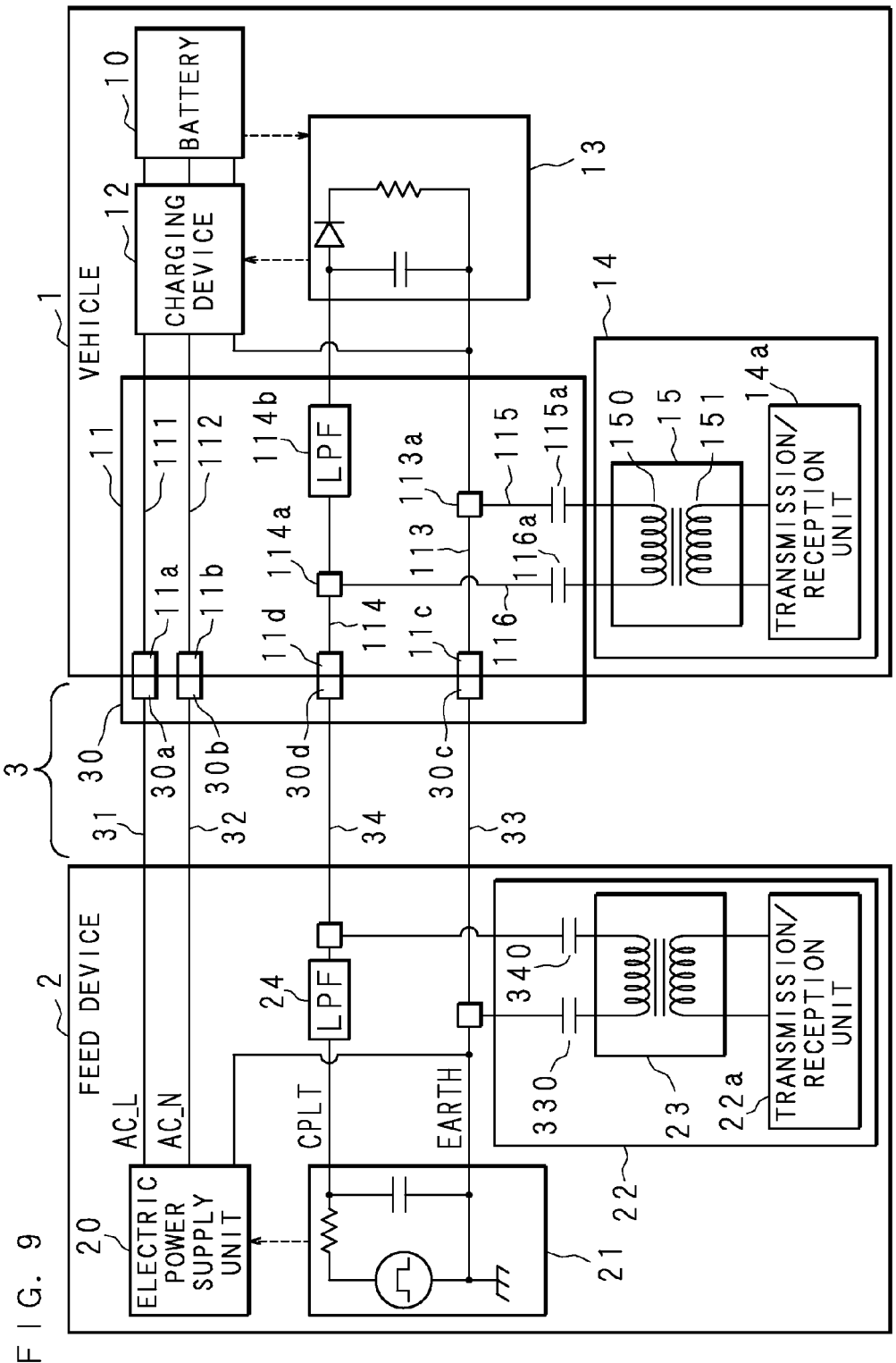
FIG. 9 is an explanatory drawing for illustrating a structure example of a charging system according to Embodiment 2.

FIG. 9 is an explanatory drawing for illustrating a structure example of a charging system according to Embodiment 2. FIG. 9 illustrates yet another structure example of Embodiment 2 of the present invention. In the structure example illustrated in FIG. 9, the power receiving connector 11 is formed by integrating the connection terminals 11a, 11b, 11c and 11d, the internal wirings 111, 112, 113 and 114, the wiring branch parts 113a and 114a, the ground wire side branch line 115, the control wire side branch line 116, the capacitors 115a and 116a, and the low-pass filter 114b with the housing 110. That is, the structure example illustrated in FIG. 3 is changed into a structure wherein the superposition separation element 15 is not integrated and is separated as in FIG. 7.

Moreover, in the structure example illustrated in FIG. 9, the superposition separation element 15 is provided inside the communication device 14. Both ends of a secondary coil 151 in the superposition separation element 15 are connected with a transmission/reception unit 14a having a function to transmit and receive a communication signal. The transmission/reception unit 14a is provided with a Tx protective circuit, an Rx filter, an AFE (Analog Front End) circuit or the like, for example.

It is to be noted that the structure of the feed device 2 is similar to that illustrated in FIG. 8, and the capacitors 330 and 340 and the superposition separation unit 23 are provided inside the communication unit 22. Moreover, a low-pass filter (LPF) is provided inside the feed device 2, and FIG. 9 illustrates an example wherein the low-pass filter 24 is provided in the control wire 34. It is to be noted that an insertion position of the low-pass filter is not limited to the control wire 34, and the low-pass filter may be inserted in the ground wire 33 or may be built in the charge control unit 21 or the communication unit 22.

Moreover, although the capacitors 115a and 116a are interposed respectively in the ground wire side branch line 115 and the control wire side branch line 116 in the present embodiment, a capacitor may be interposed in any one of the ground wire side branch line 115 and the control wire side branch line 116.

As described above, Embodiment 2 can be developed into various structures.

Embodiment 3

Embodiment 3 is a configuration wherein the receiving connector and the communication device in Embodiment 1 or 2 are connected with each other by a twisted wire pair. It is to be noted that reference signs similar to those of Embodiment 1 or 2 are attached to structures similar to those of Embodiment 1 or 2 so as to refer to Embodiment 1 or 2, and description thereof will be omitted.

A charging system according to Embodiment 3 is a configuration wherein the superposition separation element 15 and the communication device 14 integrated with the power receiving connector 11 in the structure example illustrated in Embodiment 1 or 2 are connected with each other by a twisted wire pair, and structures other than the structure between the superposition separation element 15 and the communication device 14 are not especially modified. Accordingly, regarding a structure example of the entire charging system, Embodiment 1 or 2 is to be referred to, and description thereof will be omitted.

Figure 10:
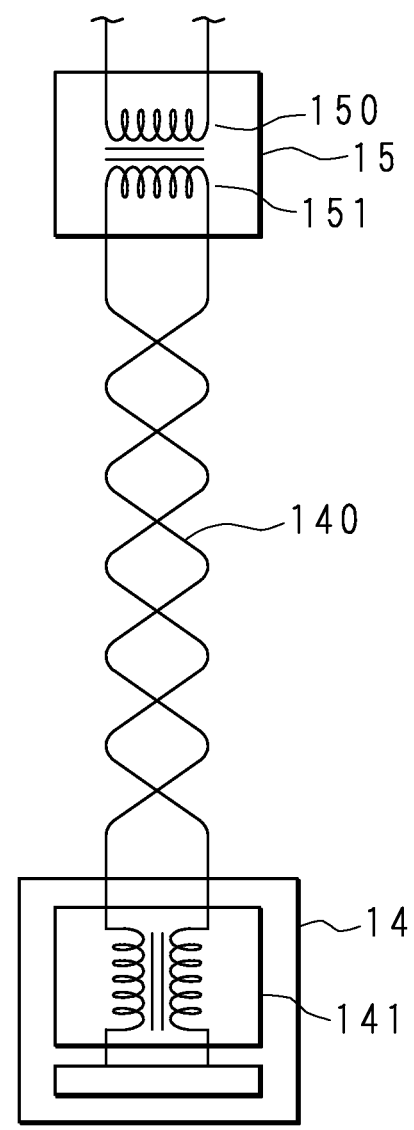
FIG. 10 is an explanatory drawing for illustrating an example of the structure between a superposition separation element and a communication device of a charging system according to Embodiment 3.
Figure 11:
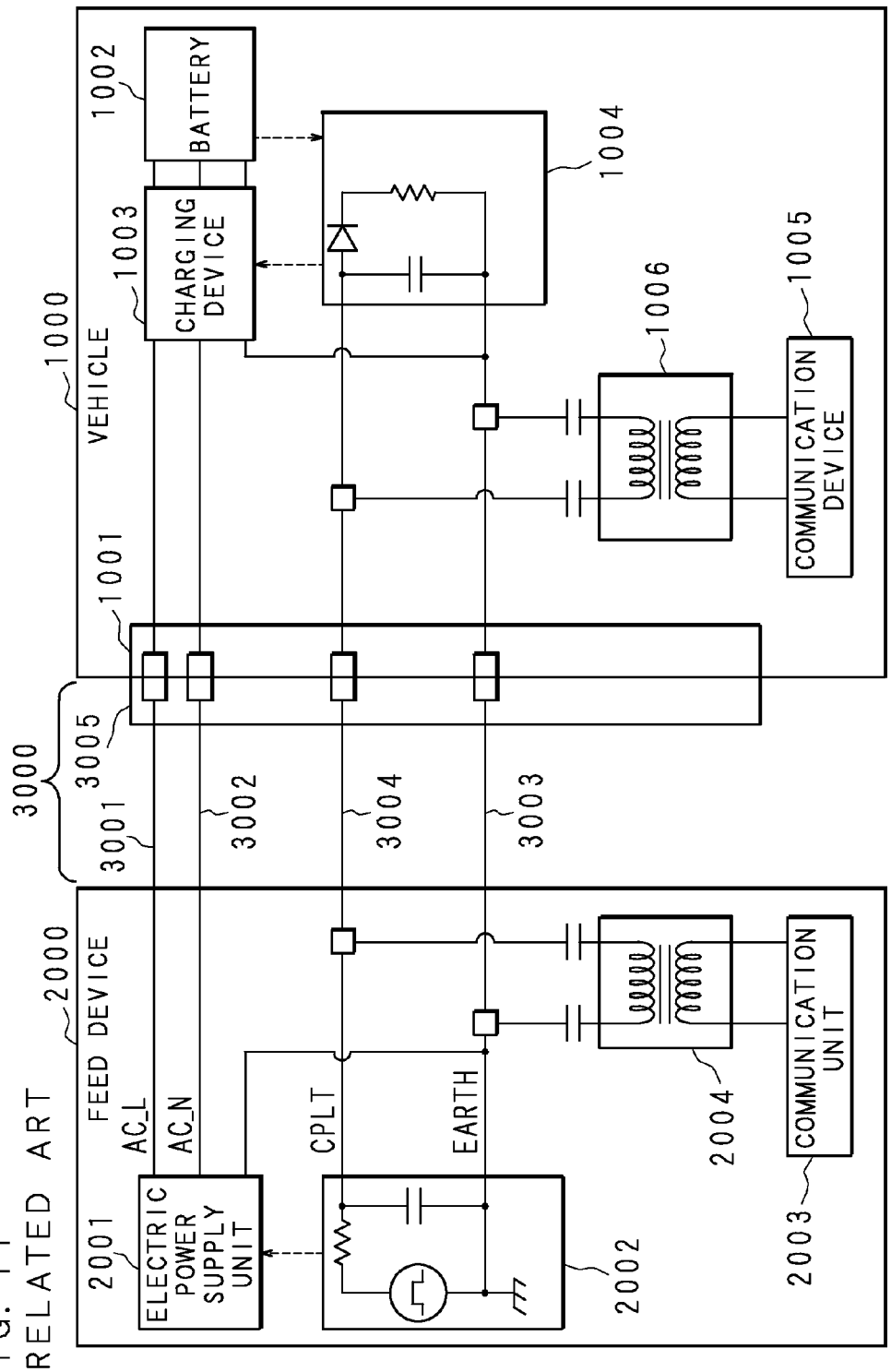
FIG. 11 is an explanatory drawing for illustrating a structure example of a system, standardization of which is being promoted.

FIG. 10 is an explanatory drawing for illustrating an example of the structure between the superposition separation element 15 and the communication device 14 of a charging system according to Embodiment 3. Wiring between the superposition separation element 15 and the communication device 14 is constituted of a twisted wire pair 140. The twisted wire pair 140 having a length of 2 to 4 m, for example, is provided in the vehicle 1. Moreover, the communication device 14 is provided with a choke coil 141 to be connected with the twisted wire pair 140.

By using the twisted wire pair 140, it is possible to reduce the influence of noise on a communication signal. Moreover, it is possible to remove noise, which flows into the communication device 14 in a common mode state through the twisted wire pair 140, from the choke coil 141 which functions as a common mode choke coil. Furthermore, it is possible to prevent noise, which is generated at a substrate in the communication device 14, from flowing out of the communication device 14.

Although the twisted wire pair 140 is used in the present embodiment, it is to be noted that a coaxial cable, parallel lines or the like may be used instead of the twisted wire pair 140. Moreover, shielding may be applied to the twisted wire pair or the like as measure against noise.

In a structure wherein a superposition separation element is built in a communication device, the superposition separation element can play the role of the choke coil. On the other hand, in the above embodiment wherein the superposition separation element 15 is provided so as to be integrated with the power receiving connector 11 as illustrated in FIGS. 1 and 3, for example, it is preferable to provide the choke coil 141 in the communication device 14.

Although the above description on the present embodiment has explained a configuration wherein the power receiving connector 11 and the communication device 14 are connected with each other by the twisted wire pair 140, it is to be noted that the capacitors 115*a* and 116*a* of the power receiving connector 11 and the primary coil 150 of the superposition separation element 15, and/or the secondary coil 151 of the superposition separation element 15 and the communication device 14 may be connected with each other by a twisted wire pair in a structure wherein the superposition separation element 15 is mounted outside the power receiving connector 11 as illustrated in FIGS. 6 and 7, for example.

The embodiments disclose only a part of innumerable examples of the present invention, and design can be modified properly in consideration of various factors such as objects, applications and specifications. For example, instead of the structure examples described above, Embodiment 2 can be developed into various configurations such that a low-pass filter is interposed in internal wiring to be connected with a ground wire or is interposed in internal wiring both at a control wire side and at a ground wire side. Moreover, instead of the low-pass filter 114*b* mounted in the receiving connector 11, a low-pass filter may be mounted inside the charge control device 13 or the communication device 14.

Moreover, the present invention is not limited to the embodiments having a configuration wherein a low-pass filter is not provided at a power feeding side, and a low-pass filter may be provided at a stand side. In addition, by providing a low-pass filter at a stand side, it is possible to prevent deterioration in communication quality due to the influence of a capacitor in an output circuit of a charge control device at a stand side. Moreover, similar effects can also be obtained at a feed device side, by putting a signal separation unit such as a branch part, a low-pass filter or a capacitor as close to a vehicle side in a feed device as possible.

Furthermore, the present invention is not limited to the embodiments having a configuration wherein both a feed device side and a vehicle side have similar structures in which a superposition separation element or the like is connected with branch lines that branch from a control wire and a ground wire, and a superposition separation element or the like may be omitted and a communication device or the like may be connected at any one of a feed device side and a vehicle side, and a superposition separation element or the like may be interposed in a control wire. Moreover, a conductor (e.g., a vehicle body or a housing) of a vehicle or a feed device may be utilized as a ground wire in the present application.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A power receiving connector, which can be placed in a vehicle and can be connected with a feeder wire to be used for power feeding, with a ground wire, and with a control wire configured to transmit a control signal to be used for power feeding control, comprising:
  a plurality of connection terminals to be connected with the feeder wire, the ground wire and the control wire;
  a plurality of internal wirings to be connected with the feeder wire, the ground wire and the control wire via the connection terminals;
  a wiring branch part provided at each of internal wiring to be connected with the ground wire and internal wiring to be connected with the control wire;
  a superposition separation element, which is connected with a ground wire side branch line that branches from the wiring branch part at a ground wire side and with a control wire side branch line that branches from the wiring branch part at a control wire side, configured to superpose and separate a communication signal, which is different from the control signal, for the ground wire and the control wire; and
  a capacitor, which is interposed in one or both of the ground wire side branch line and the control wire side branch line, configured to pass a signal of a band to be used for the communication signal.

2. The power receiving connector according to claim 1, wherein the superposition separation element has a primary coil to be connected with the ground wire side branch line and the control wire side branch line, and a secondary coil to be coupled electromagnetically with the primary coil, and
  wherein the secondary coil can be connected with a communication device configured to transmit and receive the communication signal via the control wire and the ground wire.

3. The power receiving connector according to claim 2, wherein the primary coil of the superposition separation element can be connected with the capacitor by a twisted wire pair.

4. The power receiving connector according to claim 2, wherein the secondary coil of the superposition separation element can be connected with the communication device by a twisted wire pair.

5. The power receiving connector according to claim 4, wherein a choke coil is provided in the communication device, and the secondary coil of the superposition separation element can be connected with the choke coil by a twisted wire pair.

6. The power receiving connector according to claim 1, further comprising
  a low-pass filter, which is interposed in at least one of internal wiring at a ground wire side and internal wiring at a control wire side, configured to pass a signal of a band to be used for the control signal.

7. A communication system for connecting a feed device with a vehicle, which is provided with an electric power storage device to be fed from the feed device, by a charging cable, which includes a feeder wire to be used for power feeding, a ground wire and a control wire configured to transmit a control signal to be used for power feeding control of the electric power storage device, and for transmitting and receiving a communication signal, which is different from the control signal, using the control wire as a medium, wherein the vehicle comprises a power receiving connector according to claim 1 to be connected with a charging cable extending from the feed device, and a communication device configured to transmit and receive a communication signal to and from the feed device via the power receiving connector, and wherein the communication device is connected with a secondary coil of the superposition separation element.

8. The communication system according to claim 7, wherein the power receiving connector and the communication device are connected with each other by a twisted wire pair, and wherein the communication device further comprises a choke coil to be connected with the twisted wire pair.

9. A power receiving connector, which can be placed in a vehicle and can be connected with a feeder wire to be used for power feeding, with a ground wire, and with a control wire configured to transmit a control signal to be used for power feeding control, comprising:

a plurality of connection terminals to be connected with the feeder wire, the ground wire and the control wire;

a plurality of internal wirings to be connected with the feeder wire, the ground wire and the control wire via the connection terminals;

a wiring branch part provided at each of internal wiring to be connected with the ground wire and internal wiring to be connected with the control wire;

a superposition separation element, which is connected with a ground wire side branch line that branches from the wiring branch part at a ground wire side and with a control wire side branch line that branches from the wiring branch part at a control wire side, configured to superpose and separate a communication signal, which is different from the control signal, for the ground wire and the control wire;

a capacitor, which is interposed in one or both of the ground wire side branch line and the control wire side branch line, configured to pass a signal of a band to be used for the communication signal; and a low-pass filter, which is interposed in at least one of internal wiring at a ground wire side and internal wiring at a control wire side, configured to pass a signal of a band to be used for the control signal.

10. The power receiving connector according to claim 9, wherein the superposition separation element has a primary coil to be connected with the ground wire side branch line and the control wire side branch line, and a secondary coil to be coupled electromagnetically with the primary coil, and wherein the secondary coil can be connected with a communication device configured to transmit and receive the communication signal via the control wire and the ground wire.

11. The power receiving connector according to claim 10, wherein the primary coil of the superposition separation element can be connected with the capacitor by a twisted wire pair.

12. The power receiving connector according to claim 10, wherein the secondary coil of the superposition separation element can be connected with the communication device by a twisted wire pair.

13. The power receiving connector according to claim 12, wherein a choke coil is provided in the communication device, and the secondary coil of the superposition separation element can be connected with the choke coil by a twisted wire pair.

14. A communication system for connecting a feed device with a vehicle, which is provided with an electric power storage device to be fed from the feed device, by a charging cable, which includes a feeder wire to be used for power feeding, a ground wire and a control wire configured to transmit a control signal to be used for power feeding control of the electric power storage device, and for transmitting and receiving a communication signal, which is different from the control signal, using the control wire as a medium, wherein the vehicle comprises a power receiving connector according to claim 9 to be connected with a charging cable extending from the feed device, and a communication device configured to transmit and receive a communication signal to and from the feed device via the power receiving connector, and wherein the communication device is connected with a secondary coil of the superposition separation element.

15. The communication system according to claim 14, wherein the power receiving connector and the communication device are connected with each other by a twisted wire pair, and wherein the communication device further comprises a choke coil to be connected with the twisted wire pair.

16. A power receiving connector, which can be placed in a vehicle and can be connected with a feeder wire to be used for power feeding, with a ground wire, and with a control wire configured to transmit a control signal to be used for power feeding control, comprising:

a plurality of connection terminals to be connected with the feeder wire, the ground wire and the control wire;

a plurality of internal wirings to be connected with the feeder wire, the ground wire and the control wire via the connection terminals;

a wiring branch part provided at each of internal wiring to be connected with the ground wire and internal wiring to be connected with the control wire; and a capacitor, which is interposed in one or both of a ground wire side branch line that branches from the wiring branch part at a ground wire side and a control wire side branch line that branches from the wiring branch part at a control wire side, configured to pass a signal of a band to be used for a communication signal, which is different from the control signal.

17. The power receiving connector according to claim 16, wherein the ground wire side branch line and the control wire side branch line can be connected with a superposition separation element configured to superpose and separate the communication signal, which is different from the control signal, for the ground wire and the control wire.

18. The power receiving connector according to claim 17, wherein the superposition separation element has a primary coil to be connected with the ground wire side branch line and the control wire side branch line, and a secondary coil to be coupled electromagnetically with the primary coil, and wherein the secondary coil can be connected with a communication device configured to transmit and receive the communication signal via the control wire and the ground wire.

19. The power receiving connector according to claim 18, wherein the primary coil of the superposition separation element can be connected with the capacitor by a twisted wire pair.

20. The power receiving connector according to claim 18, wherein the secondary coil of the superposition separation element can be connected with the communication device by a twisted wire pair.

21. The power receiving connector according to claim 20, wherein a choke coil is provided in the communication device, and the secondary coil of the superposition separation element can be connected with the choke coil by a twisted wire pair.

22. A communication system for connecting a feed device with a vehicle, which is provided with an electric power storage device to be fed from the feed device, by a charging cable, which includes a feeder wire to be used for power feeding, a ground wire and a control wire configured to transmit a control signal to be used for power feeding control of the electric power storage device, and for transmitting and receiving a communication signal, which is different from the control signal, using the control wire as a medium,
wherein the vehicle comprises a power receiving connecter according to claim 17 to be connected with a charging cable extending from the feed device, and a communication device configured to transmit and receive a communication signal to and from the feed device via the power receiving connector, and
wherein the communication device is connected with a secondary coil of the superposition separation element.

23. The communication system according to claim 22,
wherein the power receiving connector and the communication device are connected with each other by a twisted wire pair, and
wherein the communication device further comprises a choke coil to be connected with the twisted wire pair.

24. The power receiving connector according to claim 16, further comprising
a low-pass filter, which is interposed in at least one of internal wiring at a ground wire side and internal wiring at a control wire side, configured to pass a signal of a band to be used for the control signal.

25. A power receiving connector, which can be placed in a vehicle and can be connected with a feeder wire to be used for power feeding, with a ground wire, and with a control wire configured to transmit a control signal to be used for power feeding control, comprising:
a plurality of connection terminals to be connected with the feeder wire, the ground wire and the control wire;
a plurality of internal wirings to be connected with the feeder wire, the ground wire and the control wire via the connection terminals;
a wiring branch part provided at each of internal wiring to be connected with the ground wire and internal wiring to be connected with the control wire; and
a low-pass filter, which is interposed in at least one of internal wiring at a ground wire side and internal wiring at a control wire side, configured to pass a signal of a band to be used for the control signal,
wherein the ground wire side branch line and the control wire side branch line can be connected with a superposition separation element configured to superpose and separate a communication signal, which is different from the control signal, for the ground wire and the control wire, via a capacitor configured to pass a signal of a band to be used for a communication signal, which is different from the control signal.

26. The power receiving connector according to claim 25, wherein the superposition separation element has a primary coil to be connected with the ground wire side branch line and the control wire side branch line, and a secondary coil to be coupled electromagnetically with the primary coil, and
wherein the secondary coil can be connected with a communication device configured to transmit and receive the communication signal via the control wire and the ground wire.

27. The power receiving connector according to claim 26, wherein the primary coil of the superposition separation element can be connected with the capacitor by a twisted wire pair.

28. The power receiving connector according to claim 26, wherein the secondary coil of the superposition separation element can be connected with the communication device by a twisted wire pair.

29. The power receiving connector according to claim 28, wherein a choke coil is provided in the communication device, and the secondary coil of the superposition separation element can be connected with the choke coil by a twisted wire pair.

30. A communication system for connecting a feed device with a vehicle, which is provided with an electric power storage device to be fed from the feed device, by a charging cable, which includes a feeder wire to be used for power feeding, a ground wire and a control wire configured to transmit a control signal to be used for power feeding control of the electric power storage device, and for transmitting and receiving a communication signal, which is different from the control signal, using the control wire as a medium,
wherein the vehicle comprises a power receiving connecter according to claim 25 to be connected with a charging cable extending from the feed device, and a communication device configured to transmit and receive a communication signal to and from the feed device via the power receiving connector, and
wherein the communication device is connected with a secondary coil of the superposition separation element.

31. The communication system according to claim 30,
wherein the power receiving connector and the communication device are connected with each other by a twisted wire pair, and
wherein the communication device further comprises a choke coil to be connected with the twisted wire pair.

\* \* \* \* \*